June 18, 1957 D. O. CLAYDEN 2,796,464

ELECTRICAL PULSE SIGNALLING SYSTEMS

Filed April 26, 1954 6 Sheets-Sheet 1

DAVID O. CLAYDEN
*Inventor*

By Stevens, Davis, Miller & Mosher
*Attorneys*

June 18, 1957 D. O. CLAYDEN 2,796,464

ELECTRICAL PULSE SIGNALLING SYSTEMS

Filed April 26, 1954 6 Sheets-Sheet 2

DAVID O. CLAYDEN
*Inventor*
By Stevens, Davis, Miller & Mosher
*Attorneys*

June 18, 1957 D. O. CLAYDEN 2,796,464

ELECTRICAL PULSE SIGNALLING SYSTEMS

Filed April 26, 1954 6 Sheets-Sheet 3

DAVID O. CLAYDEN
*Inventor*
By Stevens, Davis, Miller & Mosher
*Attorneys*

June 18, 1957 D. O. CLAYDEN 2,796,464

ELECTRICAL PULSE SIGNALLING SYSTEMS

Filed April 26, 1954 6 Sheets-Sheet 4

DAVID O. CLAYDEN
*Inventor*
By Stevens, Davis, Miller & Mosher
*Attorneys*

June 18, 1957 D. O. CLAYDEN 2,796,464

ELECTRICAL PULSE SIGNALLING SYSTEMS

Filed April 26, 1954 6 Sheets-Sheet 5

DAVID O. CLAYDEN
Inventor
By Stevens, Davis, Miller & Mosher
Attorneys

DAVID O. CLAYDEN
*Inventor*
By Stevens, Davis, Miller & Mosher
*Attorneys*

United States Patent Office 2,796,464

Patented June 18, 1957

2,796,464

ELECTRICAL PULSE SIGNALLING SYSTEMS

David Oswald Clayden, Heston, England, assignor to National Research Development Corporation, London, England, a British corporation Application April 26, 1954, Serial No. 425,510

Claims priority, application Great Britain May 4, 1953

5 Claims. (Cl. 179—15)

The present invention relates to electrical pulse signalling systems in which each pulse signal is allocated a given time interval in the temporal train called a signal period, and the significance of the signal depends upon its position in the train. Such pulse signal trains occur for example, in pulse code modulation systems and in digital computers, especially those operating in the serial mode. These systems employ a master timing device which produces timing pulses to set the signal periods.

The invention is concerned with signal systems of this type in which the pulse signals can temporarily pass out of correct timing relationship with respect to the timing device, but are required to be restored in step with the timing device to occupy pre-allocated positions in a sequence of signal periods set by the timing device.

In order to be capable under any circumstances of being so restored, the deviation of the timing of the signals from the correct timing relationship must be known to within the limits of a signal period. Furthermore (unless special arrangements are provided), the timing of the signals must not deviate by as much as a single signal period so that an apparatus to which the signals are temporarily sent must be capable of operating at a rate which is sufficiently close to that of the timing device to ensure that no signal deviates from its expected time of occurrence by as much as one signal period. Known special arrangements which enable these conditions to be relaxed provide periodically special labelling synchronising signals in step with particular signal periods as they occur in the apparatus, and corresponding special synchronising signals in step with the corresponding digit periods laid down by the timing device, so that the timing of corresponding labelled signal periods can be compared, and known to within one signal period, even though the timing deviates by more than a signal period.

The present invention aims at providing arrangements by which pulse signals, occurring sequentially in a succession of signal periods in step with a timing device, may be transferred to and subsequently transferred from an apparatus so as to be restored in step with the timing device during predetermined signal periods, when it is not practicable to generate special labelling synchronising signals as above described.

The invention is particularly applicable to electronic digital computers in which pulse digit signals, occurring in a sequence of digit periods laid down by a master timing device (clock pulse generator), are required to be fed to and subsequently be derived from a digit signal storage apparatus without losing their allocated position in the digit signal sequence, even though the storage apparatus is a type (such as a magnetic recording tape) which cannot itself keep invariably in step with the rest of the computer.

The digit signals may be transformed in the storage apparatus (for example they may be added to digit signals already in the store) and in this case the successors of the digit signals would be required to be derived in these allocated positions.

Apparatus, whose timing deviates by more than one signal period with respect to a timing device, is provided with input and output devices according to the invention to enable pulse signals in step with the timing device to be temporarily transferred to and subsequently to be read from the apparatus in step with the timing device. The input device is arranged to transfer the pulse signals in a number of steps, in each of which the timing of the pulse signals is delayed by a portion of a signal period. The number of steps is arranged to be sufficient to enable the greatest deviation in timing of the apparatus to be taken up by the successive delays in the timing of the pulse signals at each step. The associated output device reads out the pulse signals from the apparatus in a corresponding number of steps to bring the pulse signals into step with the timing pulses a known integral number of signal periods later than the timing of the original pulse signals.

According to this aspect of the invention, an input or output device of an apparatus to which pulse signals are temporarily transferred from a signal source in which they occur in correct timing relationship with a timing device, consists of a series of pulse signal generators, each arranged to be fed with pulse signals from the preceding generator and to supply the next generator with the pulse signals in step with the corresponding one of a series of intermediate timing pulses received from a control arrangement. In the case of an input device the first generator in the series is fed with the pulse signals from the signal source and the output from the last generator is fed to the apparatus, while for an output device these conditions are reversed. A control arrangement consists of a number of interconnected units each producing an output which constitutes a train of intermediate timing pulses, and each having two inputs which are the outputs of the two adjacent units (in the case of the first and last units the second input is timing pulses derived from one or the other of the timing device and apparatus to which the pulses are being temporarily passed), each unit being characterised in that it produces an output pulse when the second of a pair of input pulses, one from each of the inputs, is received.

In a preferred form, each unit of the control arrangement consists of a first and second trigger which are set by pulse signals on one and the other of the inputs respectively, a coincidence gate fed with the output from the two triggers and which produces an output when an input is received from both triggers, the output from the gate being slightly delayed and being applied to the resetting inputs of both triggers, the output from the gate also being the intermediate timing pulse output of the unit.

The invention will now be described with reference to the drawings filed with this specification in which:

Figures 1(*a*), 1(*b*), 1(*c*), and 1(*d*) show various forms of control arrangements according to the invention;

Figures 2(*a*) to 2(*d*), 3(*a*) to 3(*d*), 4(*a*) to 4(*d*), and 5(*a*) to 5(*d*) depict various pulse signal trains which illustrate the manner of operation of the arrangements shown in Figures 1(*a*) to 1(*d*);

Figure 9 shows an embodiment of the invention using the control arrangement shown in Figure 1(*c*); while

Figure 5:
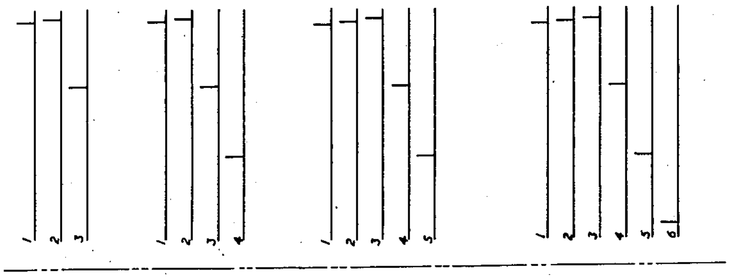

In the drawings, use has been made of the Turing system of notation, as in digital computer circuits, for showing various circuit elements. This notation is fully described in patent application Serial No. 202,615, filed December 26, 1950, now Patent No. 2,686,632, issued August 17, 1954.

Figure 1:
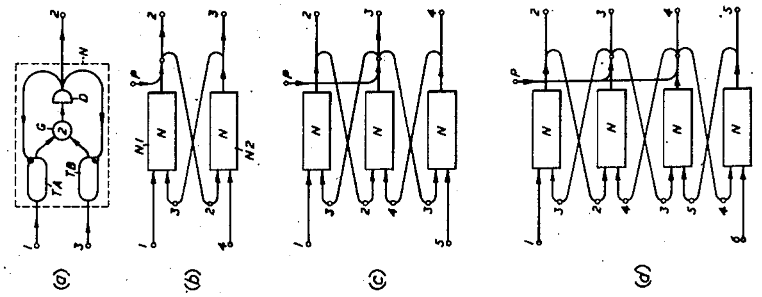

Figure 1(*a*) shows a simple control arrangement according to the invention, for producing a single train of intermediate timing pulses 2 when supplied with timing pulses 1, from the timing device operating in conjunction with a source from which pulse signals are to be supplied, and timing pulses 3 in step with the operation of an apparatus to which the pulse signals are to be temporarily transferred.

The control arrangement in this simple form is a control unit N consisting of a trigger TA set by timing pulses 1 and a trigger TB set by timing pulses 3, an and or coincidence gate G which produces an output when triggers TA and TB are both set, and a short delay D through which the output of the gate G is supplied to constitute the intermediate timing pulses 2. The output from the gate G and the delay D is in pulse form as the output from the delay D is applied to the resulting connections of triggers TA and TB so that as soon as both triggers have been on simultaneously sufficiently long to produce an intermediate timing pulse they are reset and are in readiness to produce another when the second of the next pair of timing pulses 1 and 3 is received.

Figure 3:
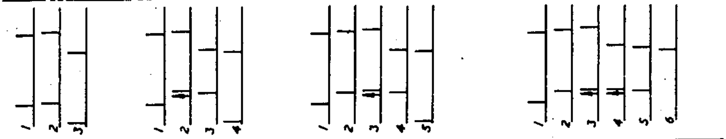
Figure 2:
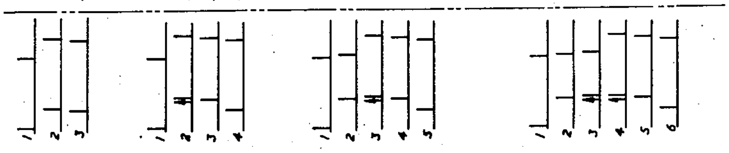

The intermediate pulses 2 will follow timing pulses 1 or 3 according to which of them is first applied to the unit N. Thus if a timing pulse 1 is applied to set the trigger TA before a timing pulse 3 sets trigger TB the first intermediate pulse 2 will follow the timing pulse 3. Figure 2(*a*) shows a typical temporal distribution of timing pulses in this case. If however a timing pulse 3 is applied first, a typical distribution would be as shown in Figure 3(*a*). In either case each intermediate pulse 2 follows a certain pair of pulses 1 and 3 and will do so provided the pair of pulses 1 and 3 do not move relative to each other by as much as two signal periods.

Figure 4:
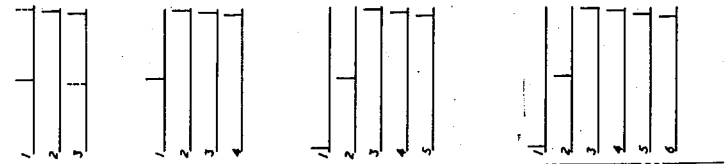

The two limiting positions of the pulses are shown in Figures 4(*a*) and 5(*a*). In Figure 4(*a*) the pulse 1 is preceding the pulse 3 by almost an entire signal period. If the pulse 1 were to advance relative to the pulse 2 the pulse 2 would process to follow the next pulse 1 (shown in Figure 4(*a*) as a broken line) whereas if the pulse 3 were to fall back, the pulse 2 would follow in the preceding pulse 3 (shown as a broken line). In either case the identity of the timing pulses 1 and 3 associated with the intermediate pulse 2 would be lost. In Figure 5(*a*) the timing pulse 3 precedes the timing pulse 1 by almost an entire signal period and for similar reasons this is a limiting position as that shown in Figure 4(*a*) is.

It will be appreciated that throughout the specification, where a maximum delay is theoretically a complete signal period or periods, this delay cannot be attained in practice due to the finite time occupied by a pulse signal. This finite time is set by the delay D in each unit N so that where delays are stated to be almost a certain number of entire signal periods, they are that number of signal periods less the appropriate number of pulse times set by delays D which are involved.

Before more complicated forms of control arrangements according to the invention are described with reference to Figures 1(*b*), 1(*c*) and 1(*d*), a simple practical embodiment of the invention which uses the control arrangements shown in Figure 1(*a*) will now be described with reference to Figures 6, 7 and 8.

Figure 6:
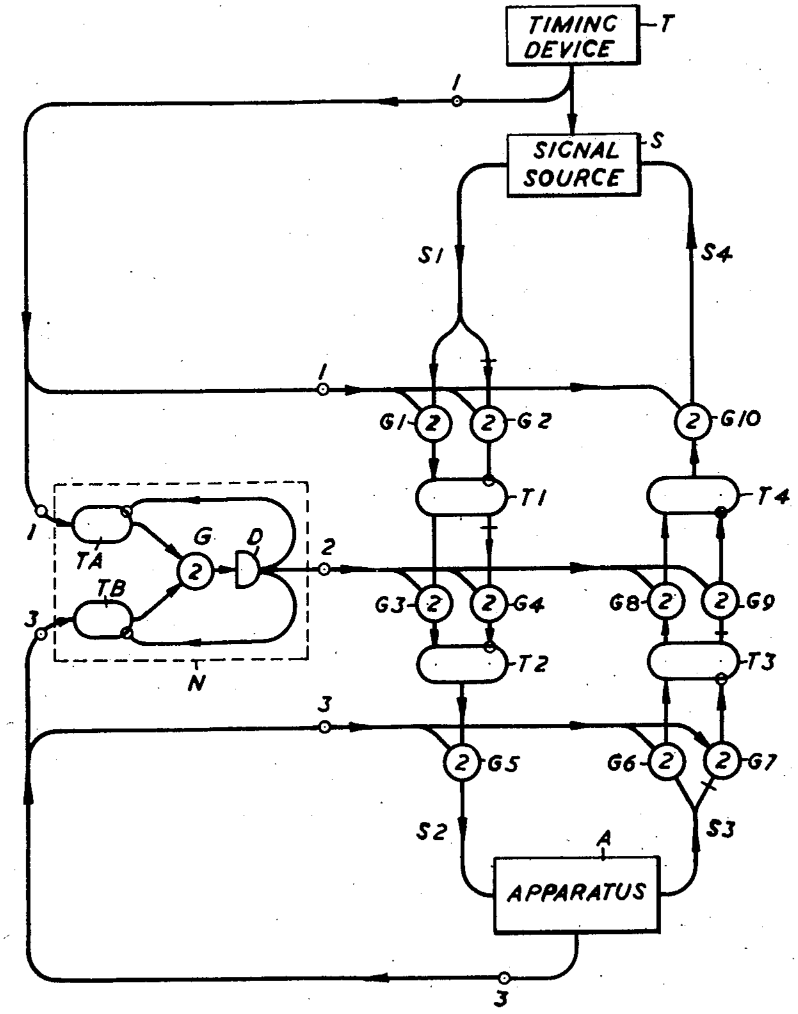
Figure 6 shows a simple embodiment of the invention using the control arrangement shown in Figure 1(*a*)

The embodiment shown in Figure 6 provides means for transferring trains of pulse signals S1 from a signal source S, in which the signals are maintained in correct timing relationship with a timing device T which produces timing pulses 1, to an apparatus A in which the signals are not maintained in correct timing relationship with the timing device; and for subsequently returning the pulse signals to the source S in step with the timing device in predetermined signal periods so that the identity of the individual signals is not lost.

The apparatus A must operate approximately in step with the timing device T so that whatever the period that a pulse signal is retained, it is discharged from the apparatus A at times which are known within a tolerance time of two signal periods. This is twice the permitted tolerance if the arrangements according to the invention were not employed.

In addition, the apparatus A must produce, or arrangements must be provided for it to produce, timing pulses 3 which mark successive signal periods as they exist in the apparatus. These timing pulses 3, which are in step with the operation of the apparatus A, and the timing pulses 1 from the timing device T, which mark the beats of the signal source S, together with intermediate timing pulses 2 derived from timing pulses 1 and 3 by a control unit N as described with reference to Figure 1(*a*), are used to control in accordance with hte invention the transfer of pulse signals in both directions between the signal source S and apparatus A.

The transfer path from the signal source S to the apparatus is by way of a trigger T1 and a trigger T2, the inputs to which are controlled by timing pulses 1 and 2 respectivey. Timing pulses 3 control the input to the apparatus A. The manner in which a typical group of pulse signals 1011 is transferred to the apparatus A will now be described in greater detail with the aid of Figure 7.

Figure 7:
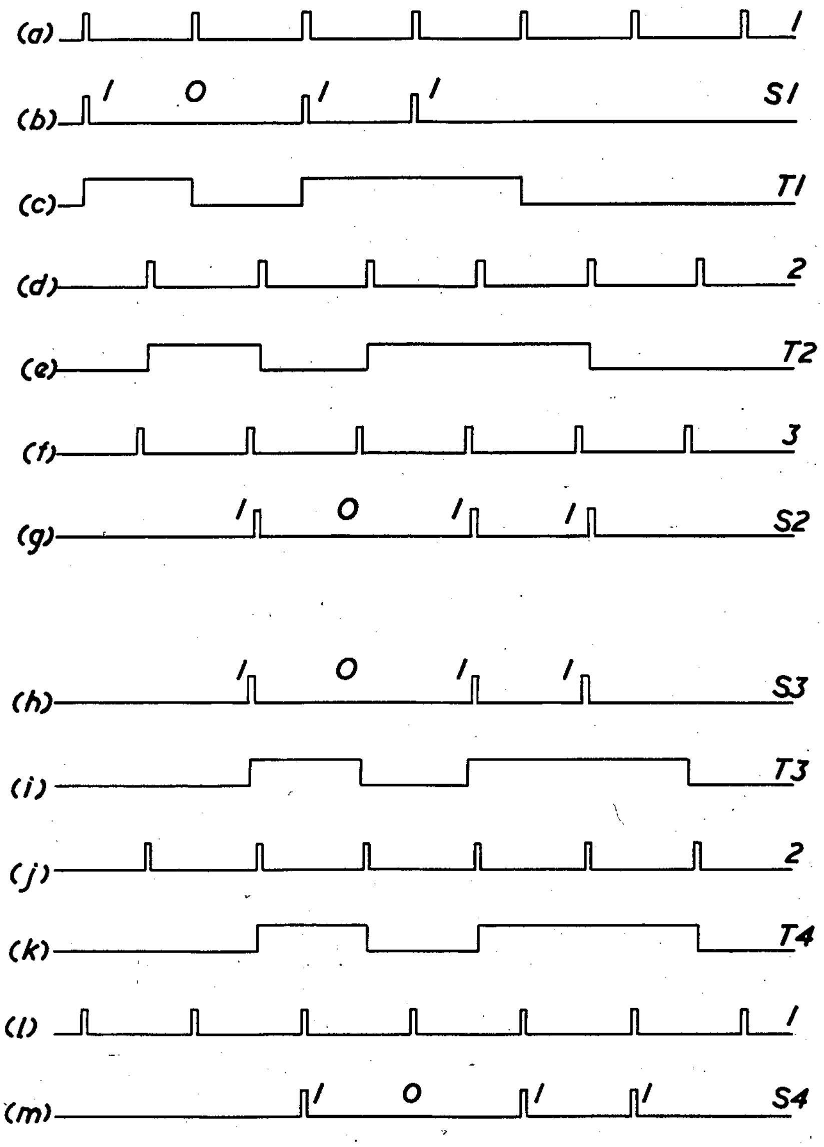
Figures 7 and 8 show voltage waveforms occurring at various parts of the arrangement shown in Figure 6.

Pulse signals S1 from the source S, as shown in Figures 7(*b*), and in inverse form are applied respectively to the setting and resetting connections of the trigger T1 through gates G1 and G2 respectively, controlled by timing pulses 1 as shown in Figure 7(*a*). The resulting output waveform from the trigger T1 is shown in Figure 7(*c*).

The output and inverse output from the trigger T1 are passed to the trigger T2 through and gates G3 and G4 respectively controlled by timing pulses 2 as shown in Figure 7(*d*) from the control unit N.

The resulting output from the trigger T2, which is as shown in Figure 7(*e*), is passed to the apparatus A through an and gate G5 controlled by timing pulses 3, as shown in Figure 7(*f*), derived from the apparatus A. The resulting input S2 to the apparatus A is then as shown in Figure 7(*g*).

By a similar but reverse process, pulse signals S3 as shown in Figure 7(*h*) from the apparatus A are returned to the source S as signals S4 after passing through triggers T3 and T4 and gates G6 to G10 controlled by the timing pulses 1 to 3 as shown in Figure 1. The output of triggers T3 and T4 are shown in Figures 7(*i*) and 7(*k*) respectively while pulse signals S4 fed back to the source S are shown in Figure 7(*m*). Timing pulses 1 and 2 are shown again for convenience in Figures 7(*l*) and 7(*j*) respectively.

Examination of Figure 7 shows that, disregarding any time that the pulse signals exist in the apparatus A, the returned pulse signals S4 are exactly two signal periods later than the original pulse signals S1. In other words the delay involved in passing pulse signals from the source S to the apparatus A added to the delay in passing them from the apparatus A back to the source S is exactly two signal periods. The pulse signals are thus returned in step with the timing device T during predetermined signal periods. This condition still applies however long the pulse signals are retained in the apparatus A provided that the timing of the apparatus keeps within the tolerance limits of two signal periods.

Figure 7 shows no change in the timing of the signals S3 emerging from the apparatus A compared with the timing of the signals S2 applied to the apparatus. The effect of a change in timing may be seen from a comparison of Figures 7 and 8, as Figure 8 shows a series of voltage waveforms 8(*a*) *to* 8(*m*) which correspond to the waveforms 7(*a*) to 7(*m*) and Figures 7 and 8 differ only in the timing of the signals S2 and S3. Thus for example, if the timing of the apparatus A when signals S2 are being admitted is such that the timing pulses 3 are relative in time to the timing pulses 1 as shown by Figures 7(*a*) and 7(*f*) then the timing of signals S2 will be as shown in Figure 7(*g*). If then the signals are retained in the apparatus A for some time during which the timing of the apparatus A advances relative to that of the timing device T so that each timing pulse 3, which is about half a signal period behind the corresponding timing pulse 1 (as shown by Figures 7(*a*), 7(*d*) and 7(*f*)), has advanced to be about three-quarters of a signal period ahead (as shown by Figures 8(*a*), 8(*d*) and 8(*f*)), then the signals S3 emerging from the apparatus A will be as shown in Figure 8(*h*). As shown in Figure 8(*m*) the timing of the signals S4 returned to the source S is in spite of this change still exactly two signal periods later than their timing would have been if they had been retained in the source S.

Figure 8:
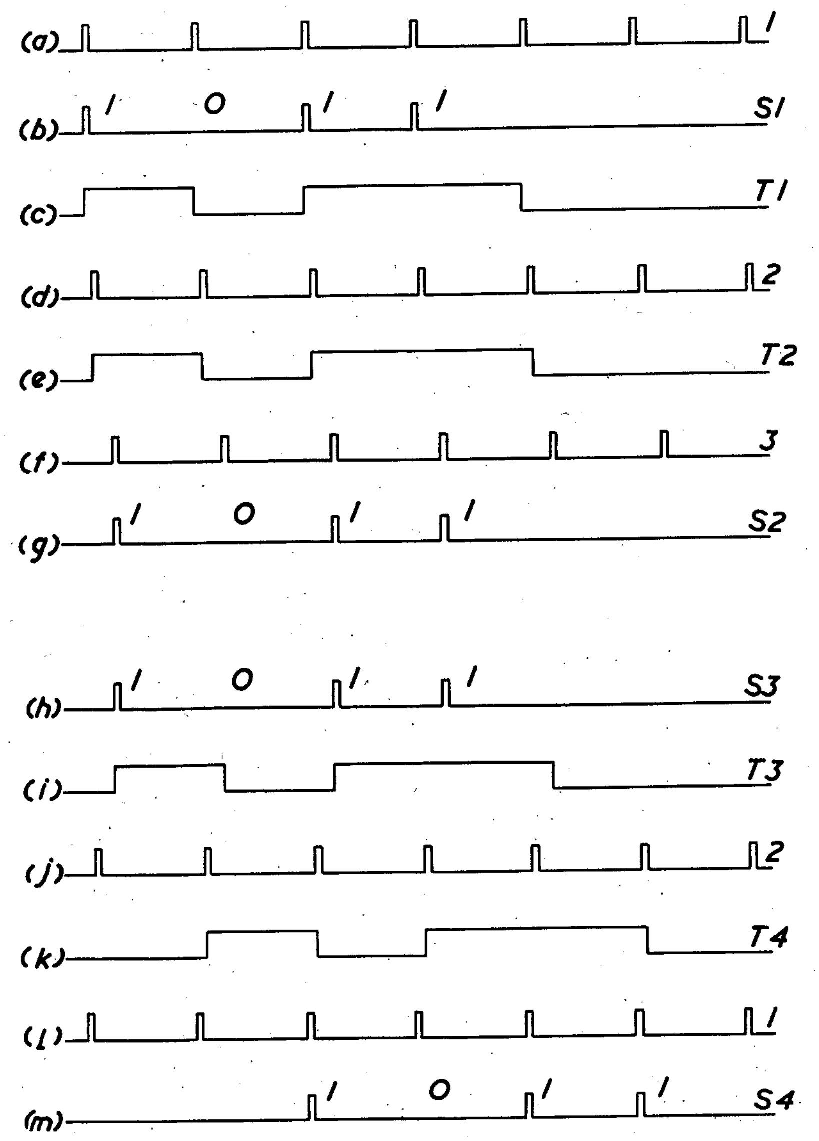

Similarly, if the timing of the apparatus A when signals S2 are being admitted is as shown in Figure 8(*g*) as the timing pulses 3 are relative in time to the timing pulses 1 as shown by Figures 8(*a*) and 8(*f*), then if the signals are retained in the apparatus A for a time during which the timing of apparatus A falls back compared with that of the timing device T until the timing pulses 3 lag behind their corresponding timing pulses 1 as shown in Figures 7(*a*) and 7(*f*), then the signals S3 emerging from the apparatus A will be as shown in Figure 7(*h*). Then as shown in Figure 7(*m*) the timing of the signals S4 is exactly two signal periods later than their timing would have been if they had been retained in the source S.

The arrangement shown in Figure 6 is representative of a combination of apparatus in an electronic digital computer in which the signal source S represents all the parts of a computer whose operation is precisely timed by clock pulses (represented by timing pulses 1) from a clock pulse generator (represented by the timing device T), while the apparatus A represents a part of the computer such as a magnetic storage apparatus to which digit pulse signals are temporarily passed, and which is not precisely timed by the clock pulse generator and so it is liable to fall a little out of step with it.

An example of such an arrangement in a computer is given in patent application Serial No. 407,419, filed February 1, 1954, by Edward A. Newman and David O. Clayden, which describes a computer having a magnetic store which is not maintained exactly in step with the clock pulse generator. In the arrangement described in this patent application the timing of the magnetic store must not vary by as much as one signal period with respect to that of the clock pulse generator and the arrangement shown in Figure 7 of the present application can be readily applied to the arrangement shown in Figure 1 of the above-referenced patent application Serial No. 407,419, filed Februay 1, 1954, the output MCP of the magnetic clock pulse generator 20 and the output DCP of the drum clock pulse generator 37 constituting the timing pulses 1 and 3 respectively. The result of modifying an arrangement such as that described in the above-referenced patent application Serial No. 407,419 filed February 1, 1954, would be that the timing of the apparatus which is not precisely timed by timing pulses can vary by almost two signal periods. In arrangements using very short signals periods employing apparatus such as rotating drum magnetic stores or magnetic recording tape stores which are difficult to precisely time, this increase in tolerance time may be very desirable or even necessary. It will be appreciated that in applying the arrangement shown in Figure 6 to a magnetic recording drum in a digital computer, the inherent two digit period timing delay between the input and output pulse signals may be readily eliminated by advancing the read head units in the path of the oncoming pulse signals stored on the rotating drum's surface relative to the position of the write head units.

Control arrangements for enabling pulse signals to be transferred between apparatus whose relative timing varies by more than two signal periods will now be described with reference to Figures 1(*b*) to 1(*d*), 2(*b*) to 2(*d*), 3(*b*) to 3(*d*), 4(*b*) to 4(*d*) and 5(*b*) to 5(*d*).

Figure 1(*b*) shows a control arrangement capable of directing transfers between an apparatus operating in step with timing pulses 1 and an apparatus operating in step with timing pulses 4, the transferred signals always being returned delayed by exactly three signal periods provided that the relative timing of the timing pulses 1 and 4 does not vary by as much as three signal periods.

The control arrangement shown in Figure 1(*b*) consists of two control units N1 and N2, each being a unit N as shown in Figure 1(*a*), the unit N1 being supplied with timing pulses 1 and the output 3 of the other unit N2 and itself producing intermediate timing pulses 2; while the second unit N2 is supplied with timing pulses 4 and pulses 2 and produces intermediate pulses 3.

In order to operate, the arrangement must be supplied with a single intermediate pulse (from a suitable one-shot device) either before or, preferably, at any time after both timing pulses 1 and 3 have been applied. Figure 1(*b*) shows a single pulse input P connected to the output of the first control unit N1 so that the unit N2 receives a pulse on both its inputs, its two triggers TA and TB are set and an output timing pulse 3 is quickly produced. This timing pulse 3 acts on the unit N1 to quickly produce a timing pulse 2 which sets the trigger TA in the unit N2, but the arrangement then cannot act to produce more intermediate timing pulses 2 or 3 until another timing pulse 4 is received. The operation so far is shown in Figure 2(*b*) for when the timing pulse 4 preceded the pulse from P, and in Figure 3(*b*) for when the timing pulse 1 preceded the pulse from P. In any of Figures 2(*b*) to 2(*d*) and 3(*b*) to 3(*d*) the arrowed pulses are the single triggering pulses from P.

When the next timing pulse 4 is applied to the unit N2, the unit quickly produces a timing pulse 3 which is applied to the first unit N1 and sets its trigger TB. If as shown in Figure 2(*b*) a timing pulse 1 has been received since the occurrence of a timing pulse 2 (when both trigger TA and TB would have been reset) the trigger TA would have been set by this timing pulse 1 and another timing pulse 2 would be quickly produced. If however no timing pulse 1 has been received meanwhile, as shown in Figure 3(*b*), then trigger TA would remain reset and a timing pulse 2 will not be produced until a timing pulse 1 is received.

The two limiting positions of a set of associated timing pulses 1, 2, 3 and 4 are shown in Figures 4(*b*) and 5(*b*). In Figure 4(*b*) the timing pulse 1 is practically one signal period ahead of the timing pulse 4, while in Figure 5(*b*) the timing pulse 4 is practically two signal periods ahead of the timing pulse 1, so that a total tolerance of almost three signal periods is provided. In any distribution of the four timing pulses, the timing pulse 2 is the last pulse. If the single pulse from P has been inserted in the output 3 from the unit N2 the timing pulse 3 would always be the last pulse of four associated pulses and timing pulse 1 would be able to move practically two signal periods ahead of timing pulse 4, while timing pulse 4 would be limited to advancing only one signal period ahead of timing signal 1. Although the relative position of the tolerance range is changed, its extent is unchanged at almost three signal periods.

A control arrangement is shown in Figure 1(*c*) for directing transfers between an apparatus operating in step with timing pulses 1 and an apparatus operating in step with timing pulses 5. Transferred signals are always returned delayed by exactly four signal periods and the permitted variation in the relative timing of timing pulses 1 and 5 is almost four signal periods.

The control arrangement shown in Figure 1(*c*) consists of three control units N, each being the same as the unit N shown in Figure 1(*a*), and being interconnected as shown. The arrangement operates generally in a similar manner to that shown in, and fully described in connection with, Figure 1(*b*). The production of intermediate timing pulses 2, 3 and 4 is initiated after the application of timing pulses 1 and 5 by the application of a starting pulse from P to the output connection of the middle control unit N as shown. The resulting production of timing pulses is shown in Figures 2(*c*) and 3(*c*) respectively for the cases where the starting pulse (headed with an arrow in the drawings) is applied after a timing pulse 5 and after a timing pulse 1.

The two limiting positions of a set of associated timing pulses 1, 2, 3, 4 and 5 are shown in Figures 4(*c*) and 5(*c*). In Figure 4(*c*) the timing pulse 1 is practically two signal periods ahead of timing pulse 5, while in Figure 5(*c*) the timing pulse 5 is practically two signal periods ahead of timing pulse 1, so that a total tolerance of nearly four signal periods is provided.

A control arrangement is shown in Figure 1(*d*) for transfers between an apparatus operating in step with timing pulses 1 and an apparatus operating in step with timing pulses 6. Transferred signals are always returned delayed by exactly five signal periods while the permitted variation in timing of the timing pulses 1 and 6 is almost five signal periods.

The control arrangement shown in Figure 1 (*d*) consists of four interconnected control units N, each being the same as the unit N shown in Figure 1(*a*). The arrangement operates generally in a similar manner to those shown in Figures 1(*b*) and 1(*c*). The production of intermediate timing pulses 2, 3, 4 and 5 is initiated after the application of timing pulses 1 and 6, by the application of a starting pulse from P to the output connections of both the middle control units N as shown. The resulting production of timing pulses is shown in Figures 2(*d*) and 3(*d*) respectively for the cases where the starting pulses are applied after a timing pulse 6 and after a timing pulse 1.

The two limiting positions of a set of associated pulses 1, 2, 3, 4, 5 and 6 are shown in Figures 4(*d*) and 5(*d*). In Figure 4(*d*) the timing pulse 1 is practically two signal periods ahead of timing pulse 6, while in Figure 5(*d*) the timing pulse 5 is nearly three signal periods ahead of timing pulse 1, so that a total tolerance of nearly five signal periods is provided. It should be noted that the limiting positions as shown in Figures 4(*d*) and 5(*d*) occur when the original short pulses follow a timing pulse 1 and as a result timing pulse 3 is established as the last pulse of each set as shown in Figure 3(*d*). However, if the initial conditions were as shown in Figure 2(*d*) and a timing pulse 4 is established as the last pulse of each set, then the two limiting positions of a set of pulses are when timing pulse 1 is almost three signal periods ahead of timing pulse 6 and when timing pulse 6 is almost two signal periods ahead of timing pulse 1. The permitted tolerance in either case is of course almost five signal periods.

From the description of the control arrangements shown in Figures 1(*a*) to 1(*d*) it will be clear that control arrangements for transferring signals between apparatuses which fluctuate in relative timing by considerable amounts may be provided. These control arrangements would consist of many control units N with their inputs consisting of the outputs of the control units on either side, the end units being also supplied with timing pulses from the apparatuses concerned in the transfer of signals. If $n$ control units are provided, then the total delay imposed in the transfer to and in the transfer from an apparatus is $(n+1)$ signal periods while the permitted tolerance of the timing between the two sets of timing pulses is almost $(n+1)$ signal periods.

It will be appreciated that the starting conditions of a control arrangement effect the setting of the permitted range of relative timing between the two apparatuses that the control arrangement enables to be provided. Preferably a control arrangement commences to operate when both the apparatuses are operating steadily with their relative timing at the middle of the permitted range to be set up.

Figure 9:
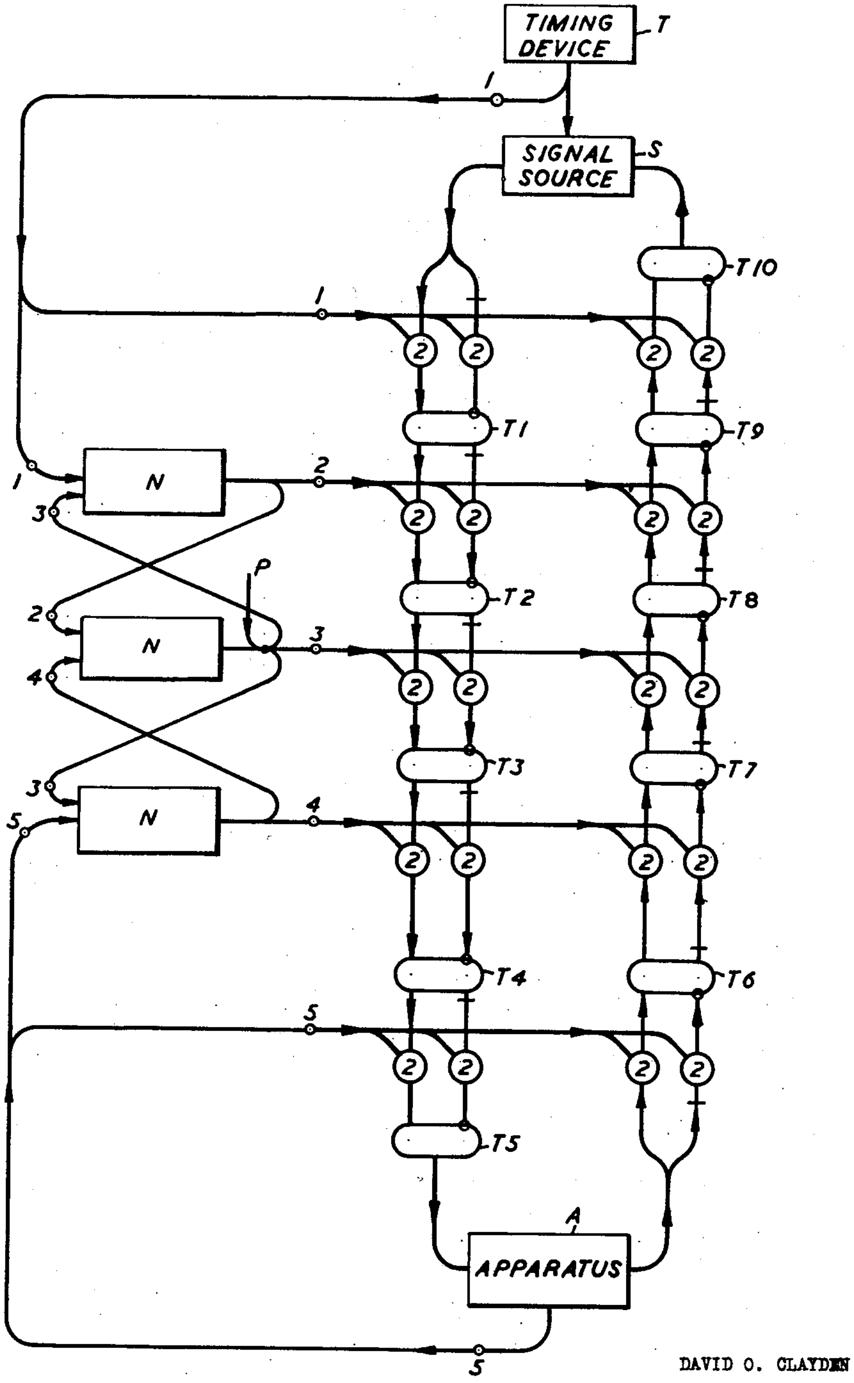

An embodiment of the invention is shown in Figure 9 for transferring pulse signals between a signal source S and an apparatus A which employs a control arrangement as shown in and described with reference to Figure 1(*c*). The general arrangement and manner of operation is similar to that of the embodiment shown in Figure 6, except that it is adapted to be controlled by timing pulses 1 and 5 from timing device T and the apparatus A respectively and by intermediate timing pulses 2, 3 and 4 produced by a control arrangement consisting essentially of three control units N inter-connected as described with reference to Figure 1(*c*).

Figure 10:
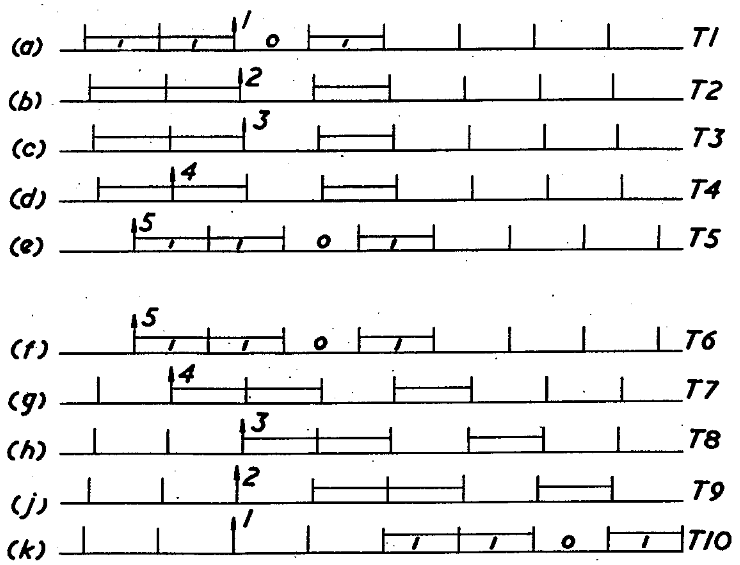
Figures 10 and 11 show voltage waveforms occurring at various parts of the arrangement shown in Figure 9.

Transfers from the signal source S to the apparatus A are made through a chain of triggers T1 to T5, the inputs to each of which are controlled by timing pulses 1 to 5 respectively as shown. It will be appreciated from the description of Figure 1(*c*) that a transfer can commence when a start pulse is applied from P to the output of the middle control unit N of the control arrangement. The change in timing of a sample set of four signals 1101 as they pass along the transfer path is illustrated in Figures 10(*a*) to 10(*e*) for a particular moment when the timing of the apparatus A is more than one signal period in advance of that of the timing device T. In Figure 10(*a*) timing pulses 1 are shown for about eight signal periods together with the set of four signals 1101 as they appear on the output of trigger T1. Similarly, Figures 10(*b*) to 10(*e*) show respectively timing pulses 2, 3, 4 and 5 together with the set of signals as they appear on the outputs of triggers T2, T3, T4 and T5 respectively. A set of five associated timing pulses 1, 2, 3, 4 and 5 is identified by arrow heads in Figures 10(*a*) to 10(*e*).

Transfers from the apparatus A to the signal source S take place through the chain of triggers T6 to T10 controlled by timing pulses 5 to 1 respectively as shown in Figure 9. The change in timing of the set of four signals 1101 as they pass along this return transfer path is illustrated in Figures 10(*f*) to 10(*k*) for the case when the output of the apparatus A is in step with the input as shown in Figure 10(*e*). The timing pulses 5 to 1 together with the outputs of the triggers T6 to T10 are shown in Figures 10(*f*) to 10(*k*) respectively. The set of five associated timing pulses 5, 4, 3, 2 and 1 identified by arrow heads in Figures 10(*a*) to 10(*e*) are also similarly identified in Figures 10(*f*) to 10(*k*).

Figure 11:
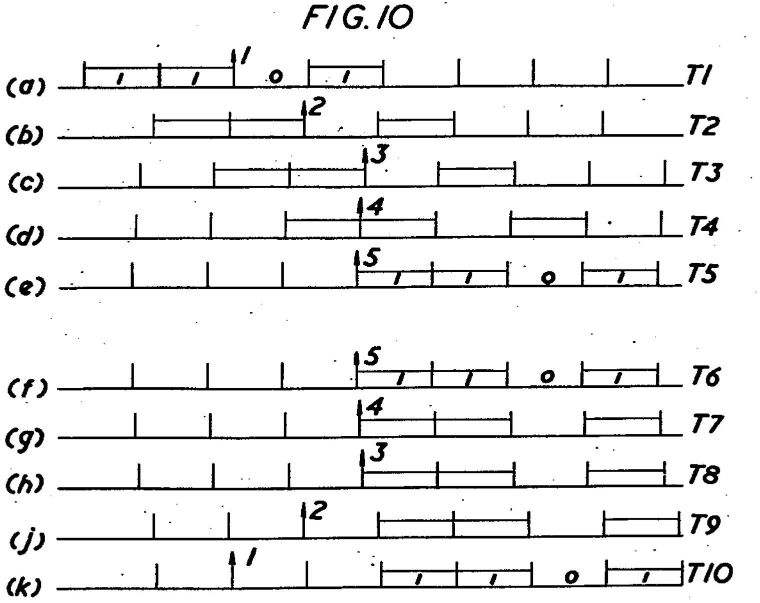

Figures 10(*a*) to 10(*k*) show how the timing of a group of signals 1101 changes step by step as it is transferred to and from the apparatus A, without any change in the timing of the signals while in the apparatus A, and while the apparatus A is about one and a half signal periods in advance of the signal source S. Figures 11(*a*) to 11(*k*) show how the timing of this group of signals changes for a similar two-way transfer, while the timing of the apparatus A is unchanged at nearly two signal periods behind that of the signal source S. Each of Figures 11(*a*) to 11(*k*) are equivalent to the corresponding Figures 10(*a*) to 10(*k*). In either case the total delay imposed by the double transfer (Figures 10(*a*) to 10(*k*) and 11(*a*) to 11(*k*)) is exactly four signal periods. It will be appreciated from the description of Figures 7 and 8 that this delay is imposed even though the timing of the apparatus A changes while signals are retained in it, provided that these changes are within the permitted limits. Thus for example, if the signals are transferred to the apparatus A in a manner illustrated by Figures 10(*a*) to 10(*e*) and the signals are then retained in the apparatus A while the timing retards to that shown in Figure 11(*f*), the return transfer is then illustrated by Figures 11(*f*) to 11(*k*) and the signals are still returned with an overall relative delay of four signal periods. Similarly, if the signals are transferred to the apparatus A in a manner illustrated by Figures 11(*a*) to 11(*e*) and are then retained in the apparatus A while the timing advances to that shown in Figure 10(*f*), the return transfer is then illustrated by Figures 10(*f*) to 10(*k*) and the signals are also still returned with an overall relative delay of four signal periods. It will be seen from Figures 10 and 11 and Figures 4(*c*) and 4(*d*) that this over-all delay of four signal periods may in one limiting position be made up of a slight delay in passing from the signal source S to the apparatus A and a delay of almost four signal periods in passing back to the source S, while in the other limiting position it can be made up of a delay of almost four signal periods in passing to the apparatus A and a slight delay in passing back to the source S. The relative permitted time variation between the signal source S and the apparatus A which the arrangement shown in Figure 9 therefore allows, is almost four signal periods between these two limiting positions.

Embodiments of the invention for transferring pulse signals between timing systems whose relative timing relationship fluctuates over many signal periods may be composed of control arrangements having many control units N controlling transfer paths which are straight forward extensions of those shown in Figure 9.

I claim:

1. A pulse signalling control system comprising a source of a first train of timing pulses occurring at intervals of a signal period, a source of a second train of timing pulses occurring at intervals of the said signal period but which may vary in timing with respect to said first train by an amount up to almost two signal periods, and a control unit having a first trigger to which said first train of timing pulses is applied, a second trigger to which the second train of timing pulses is applied, each trigger being set by each applied timing pulse, a coincidence gate fed with the output from said two triggers and which produces an output when both triggers are set, a delay device means for slightly delaying the output from said coincidence gate and applying it to the resetting connections of each trigger to reset said triggers immediately after they have both been put on, the output from said delay device means being a train of intermediate timing pulses in which each timing pulse occurs immediately after the occurrence of the latter of a pair of associated input timing pulses, consisting of one timing pulse in each of the first and second trains of timing pulses.

2. A pulse signal control system according to claim 1 and comprising a generator of a predetermined train of pulse signals occurring at intervals of said predetermined signal period, a first, an intermediate, and a final pulse signal circuit arranged in series and controlled respectively by the said first train of timing pulses, the said train of intermediate timing pulses and the said second train of timing pulses, the first and intermediate pulse signal circuits comprising triggers producing a train of coalesced pulse signals whose significance can be determined over an entire signal period which is in step with the controlling train of timing pulses, whereby each pulse signal circuit output corresponds to said predetermined train of pulse signals and is delayed by a portion of a signal period with respect to the output of the preceding pulse signal circuit.

3. A pulse signalling control system comprising a source of a first train of timing pulses occurring at intervals of a predetermined signal period, a source of a second train of timing pulses occurring at intervals of the same signal period but which may vary in timing with respect to the first train by an amount up to almost *n* signal periods, where *n* is an integer which is at least three, and ($n-1$) interconnected control units arranged in a predetermined order and each producing an output train of intermediate timing pulses, each control unit having two inputs which are the outputs of the two adjacent units for units between two other units and which are the output of the second unit and the first train of timing pulses for the first unit and the second train of timing pulses and the output of the penultimate unit for the last unit, each control unit having a trigger to which one input is applied and another trigger to which the other input is applied, each trigger being arranged to be set by each applied timing pulse, a coincidence gate fed with the output from the two triggers and which produces an output when both triggers are set, and each control unit having a delay device for slightly delaying the output from the coincidence gate and applying it to the resetting connections of each trigger to reset the triggers immediately after they both have been put on, the output from the delay device being the output train of intermediate timing pulses from the control unit in which each timing pulse occurs immediately after the occurrence of the latter of a pair of associated input pulses, consisting of one pulse in each of the two inputs.

4. A pulse signal control system according to claim 3 and comprising a generator of a predetermined train of pulse signals occurring at intervals of said signal period, a first, a plurality of intermediate and a final pulse signal circuit arranged in series and controlled respectively, by the said first train of timing pulses, the said trains of intermediate timing pulses from the said control units in order, and the said second train of timing pulses, each of the first and all the intermediate pulse signal circuits comprising a trigger which produces a train of coalesced pulse signals whose significance can be determined over an entire signal period which is in step with the controlling train of timing pulses whereby each pulse signal circuit output corresponds to the predetermined train of pulse signals and is delayed by a portion of a signal period with respect to the output of the preceding pulse signal circuit.

5. A generator of a serial train of pulse signals which occur at intervals of a signal period, an apparatus to which the train of pulse signals can be temporarily transferred and whose timing can deviate with respect to the timing pulses by nearly *n* signal periods where *n* is an integer greater than one, an input device which transfers pulse signals to said apparatus in *n* steps in each of which the pulse signals are delayed by a portion of a signal period, and an output device which transfers pulse signals from said apparatus in *n* steps in each of which the pulse signals are delayed by a portion of a signal period, whereby the total delay imposed on a pulse signal in being transferred to, stored in, and subsequently transferred from the apparatus is *n* signal periods.

References Cited in the file of this patent

UNITED STATES PATENTS

| | | |
|---|---|---|
| 1,786,805 | Wensley | Dec. 30, 1930 |
| 2,552,968 | Hochwald | May 15, 1951 |
| 2,557,086 | Fisk | June 19, 1951 |
| 2,656,106 | Stabler | Oct. 20, 1953 |
| 2,656,460 | McMillan | Oct. 20, 1953 |
| 2,679,638 | Bensky | May 25, 1954 |
| 2,685,082 | Beman | July 27, 1954 |